(12) United States Patent
Sato et al.

(10) Patent No.: US 7,651,779 B2
(45) Date of Patent: Jan. 26, 2010

(54) RESIN COMPOSITION HAVING EASY-OPENABLE PROPERTY

(75) Inventors: Masanobu Sato, Urayasu (JP); Eiichi Taguchi, Sashima-gun (JP)

(73) Assignees: Du Pont-Mitsui Polychemicals Co., Ltd., Minato-Ku, Tokyo (JP); Tohcello Co., Ltd., Chuo-Ku, Tokyo (JP)

( * ) Notice: Subject to any disclaimer, the term of this patent is extended or adjusted under 35 U.S.C. 154(b) by 333 days.

(21) Appl. No.: 10/544,184

(22) PCT Filed: Jan. 30, 2004

(86) PCT No.: PCT/JP2004/000881

§ 371 (c)(1), (2), (4) Date: Apr. 3, 2006

(87) PCT Pub. No.: WO2004/067626

PCT Pub. Date: Aug. 12, 2004

(65) Prior Publication Data

US 2006/0210801 A1    Sep. 21, 2006

(30) Foreign Application Priority Data

Jan. 31, 2003    (JP) .............................. 2003-024600

(51) Int. Cl.
B32B 5/16    (2006.01)
B32B 27/00    (2006.01)
B32B 27/08    (2006.01)

(52) U.S. Cl. .................... 428/500; 428/323; 428/515

(58) Field of Classification Search ....................... None
See application file for complete search history.

(56) References Cited

U.S. PATENT DOCUMENTS

| 5,277,988 A | 1/1994 | Sugi et al. |
| 6,503,637 B1 | 1/2003 | Van Loon |

FOREIGN PATENT DOCUMENTS

| JP | 2-185547 A | 7/1990 |
| JP | 5-6513 B2 | 1/1993 |
| JP | 5-64593 B2 | 9/1993 |
| JP | 2000-191046 A | 7/2000 |
| JP | 2000-198170 A | 7/2000 |
| JP | 2000-355358 A | 12/2000 |

OTHER PUBLICATIONS

Patent Abstracts of Japan, vol. 1996, No. 12, Dec. 26, 1996 & JP 08 197694 A (Tonen Chem Corp), Aug. 6, 1996.

*Primary Examiner*—Sheeba Ahmed
(74) *Attorney, Agent, or Firm*—Buchanan Ingersoll & Rooney PC

(57) ABSTRACT

The present invention relates to a resin composition having an easy-openable property which comprises an ethylene polymer composition (D) comprising 5 to 65 wt % of a propylene polymer (A), 1 to 35 wt % of an ethylene/α-olefin random copolymer (B) having a density of less than 895 kg/m$^3$ and 10 to 85 wt % of an ethylene polymer (C) having a density of 895 kg/m$^3$ and more (in a total amount of 100 wt %), and a film thereof. The resin composition having an easy-openable property is useful as lid materials especially for propylene polymer containers and provides excellent sealability and easy openability and further provides excellent heat resistance and oil resistance.

9 Claims, No Drawings

RESIN COMPOSITION HAVING EASY-OPENABLE PROPERTY

TECHNICAL FIELD

The present invention relates to a resin composition having an easy-openable property (a peelable seal resin composition) having excellent heat [resistance] and oil resistance, which exhibits excellent sealability and peelable seal property for various materials, and use thereof. More particularly, the present invention relates to a resin composition having an easy-openable property, which is excellent in easy and smooth peelability with a propylene polymer substrate, antiblock property, hygienic property, film processability, lamination processability, etc. And also the present invention relates to the sealable mono-layer and/or multi-layer film, where the peelable seal resin compound is used, and also lid and/or package, where the sealable film is used.

BACKGROUND ART

The package system, where a plastic container such as bottle, cup or tray is sealed with lid comprising laminated plastic film or laminated aluminum foil, is widely used for packages such as snack package for rice crackers, potato chips, fluid package for jelly, milk, yogurt, pudding, tofu (soybean curd), lactic acid beverage, etc., blister package, and other package for medical drug, medical instruments, daily goods and miscellaneous goods. These packages are required for mechanical strength to withstand distribution channels, the sealing strength to keep their hygienic property, and easy peelability.

Packages in which films categorized as easily openable (easily strippable or easily peelable) films are used as the innermost heat-sealed layer of bags or lid materials have been widely utilized as one of the materials used for such packaging. While various heat-sealed layers proposed so far have a strong heat seal strength for the purpose of tight sealing, its easy peelability is insufficient. Therefore, it is required to strike a proper balance between the heat seal strength and the easy peelability. The characteristics required for the easy peelability herein are not only easy opening but also no residues of resin, which will be caused by a stringing phenomenon after opening in an unsealed region after it is unsealed, i.e., the overall evaluation, including good appearance of the unsealed region, thereby to judge whether good or bad.

Many proposals have been made hitherto for films having such an easy-openable property (easy peelability). For example, Japanese Patent Publication No. HEI 5(1993)-64593 proposes an easily openable package comprising a layer of polypropylene resin/polyethylene resin mixture as an easily peelable layer and a high density polyethylene resin layer. Japanese Patent Publication No. HEI 5(1993)-6513 proposes a sealant film for lid materials comprising an adhesive layer (easily peelable layer) composed of a resin mixture of polypropylene and polyethylene and a substrate layer (laminated layer). Furthermore, Japanese Patent Laid-Open Publication No. HEI 2(1990)-185547 proposes a resin composition for easily openable heat seal comprising an ethylene-α-olefin copolymer, a propylene-ethylene copolymer and low density polyethylene, and Japanese Patent Laid-Open Publication No. 2000-355358 proposes a multi-layer sheet having a sealed layer comprising a polypropylene resin, an ethylene-α-olefin random copolymer resin having a density of 930 kg/m³ or less and a polyethylene resin composition. In these films, however, the layer of a mere mixture of polypropylene resin and polyethylene resin is used as a heat-sealed layer and the films are not yet necessarily satisfactory in view of the balance between sealability and easy openability.

Particularly in recent years, propylene polymers have been heavily used as materials for packaging containers, in view of transparency, heat resistance, hygienic properties, strength, costs, etc. Moreover, package is sterilized by high temperature, depending on the kind of contents. For these reasons, heat sealable materials for having an easy-openable property are strongly required to ensure excellent balance between sealability and easy openability for propylene polymers as well as excellent heat resistance, namely, maintaining the sealing strength to withstand air expansion in the inside of packages upon sterilization processing at high temperatures and minimizing changes in the sealing strength caused by such high temperature processing. However, the materials proposed above fail to meet these requirements.

The present inventors made extensive studies to develop heat sealable materials having an easy-openable property, which satisfy all of the performance requirements described above, and especially for propylene polymers, which are excellent in sealability, easy openability and appearance when opening, have heat seal strength with less temperature dependency and minimize changes in sealing strength even by high temperature sterilization. As a result, it has been found that by the use of an ethylene polymer composition prepared by adding a specific ethylene/α-olefin random copolymer to a propylene polymer and an ethylene polymer, a heat sealable material having an easy-openable property, which is excellent in easy peelability from a propylene polymer layer, smooth feeling when opening, antiblocking properties, hygienic properties, film processability and lamination processability, can be obtained. Thus, the present invention has been attained.

DISCLOSURE OF THE INVENTION

The present invention relates to a resin composition having an easy-openable property, which comprises an ethylene polymer composition (D) comprising 5 to 65 wt % of a propylene polymer (A), 1 to 35 wt % of an ethylene/α-olefin random copolymer (B) having a density of less than 895 kg/m³ and 10 to 85 wt % of an ethylene polymer (C) having a density of 895 kg/m³ or more (in a total amount of 100 wt %), a heat-sealable film comprising the resin composition, a heat-sealable laminated film having laminated on one surface of the film a laminated layer and/or a substrate layer, a lid material for containers and a package using the same.

PREFERRED EMBODIMENTS FOR CARRYING OUT THE INVENTION

Hereinafter, the present invention will be described in detail.

Propylene Polymer (A)

The propylene polymer (A) in accordance with the present invention is a resin generally produced/sold under the name of polypropylene, which is normally a propylene homopolymer having a density of approximately 890 to 930 kg/m³ or a copolymer of propylene and a small amount of other α-olefins. The copolymer can be a random copolymer or a block copolymer. Examples of the other α-olefins in the propylene copolymer include α-olefins having about 2 to about 20 carbon atoms, including ethylene, 1-butene, 1-pentene, 1-hexene, 1-octene, 1-decene, 4-methyl-1-pentene, etc. These other α-olefins can be used as α-olefin homopolymers, or as copolymers produced by copolymerization of two or more α-olefins.

Of these propylene polymers, it is preferred to use random copolymers of propylene and α-olefins, especially random copolymers of propylene and α-olefins having 2 to 4 carbon atoms, e.g., random copolymers having the ethylene and/or 1-butene content of 20 mol % or less, preferably 10 mol % or less. In order to impart sufficient heat resistance to the heat sealable material, it is preferred that the polymers are highly crystalline random copolymers having a melting point of 125° C. or higher, preferably from 130 to 170° C., when measured by a differential scanning calorimeter (DSC). Further considering heat resistance, extrusion processability, etc., it is preferred to use polymers having a melt flow rate (MFR) (ASTM D1238, 230° C., under the load of 2160 g) of 0.01 to 100 g/10 mins., preferably 0.1 to 70 g/10 mins. These propylene polymers can be obtained, e.g., by polymerizing propylene or copolymerizing propylene with one or more other α-olefins, in the presence of a catalyst prepared from a solid titanium catalyst component and an organometal compound catalyst component, a catalyst prepared from these components and an electron donor, or a single site catalyst typically represented by a metallocene catalyst. These polymers can be used as the propylene polymer (A) in combination of at least two polymers. A density of the propylene polymer (A) in accordance with the present invention was measured without annealing by the density gradient column method, based on ASTM D1505.

Ethylene/α-Olefin Random Copolymer (B)

The ethylene/α-olefin random copolymer (B) in accordance with the present invention is a random copolymer having a density of less than 895 kg/m$^3$, preferably 875 to 890 kg/m$^3$ comprising ethylene and an α-olefin having 3 to 10 carbon atoms, preferably at least 4 carbon atoms, more preferably 4 to 10 carbon atoms, for example, propylene, 1-butene, 1-heptene, 1-hexene, 1-octene, 4-methyl-1-pentene, etc. In view of heat seal characteristics of the resin composition, it is advantageous for the random copolymer (B) to have an ethylene content in the range preferably from 70 to 95 mol %, more preferably from 80 to 93 mol % and most preferably from 85 to 93 mol %, a crystallinity in the range of preferably 40% or less, more preferably 5 to 40% and most preferably 7 to 30% as measured by X-rays, a molecular weight distribution (a ratio of the weight average molecular weight (Mw) to the number average molecular weight (Mn)) of preferably 3 or less and more preferably 2.5 or less as determined by gel permeation chromatography (GPC), and a melting point of preferably 40 to 100° C. and more preferably 60 to 90° C. as determined from an endothermic curve by a differential scanning calorimeter (DSC) at a temperature elevation rate of 10° C./min. Further in view of processability, oil resistance, etc. of the resin composition, it is advantageous for the random copolymer (B) to have an MFR (ASTM D1238, 190° C., under the load of 2160 g) in the range preferably from 0.01 to 20 g/10 mins. and more preferably from 0.1 to 10 g/10 mins. These copolymers can be obtained by copolymerizing ethylene with α-olefins in the presence of a catalyst, for example, a catalyst formed of a transition metal compound catalyst component such as vanadium or zirconium compound with an organoaluminum compound catalyst component, or a single site catalyst represented by a metallocene catalyst. These random copolymers (B) may be used in combination of two or more. A density of the ethylene/α-olefin random copolymer (B) in accordance with the present invention was measured without annealing by the density gradient column method, based on ASTM D1505.

Ethylene Polymer (C)

The ethylene polymer (C) in accordance with the present invention is a homopolymer of ethylene having a density of 895 kg/m$^3$ or more, preferably 900 to 970 kg/m$^3$, or a random copolymer of ethylene and a small quantity of α-olefin having 3 to 10 carbon atoms, for example, propylene, 1-butene, 1-heptene, 1-hexene, 1-octene, 4-methyl-1-pentene, etc., in other words, a polymer mainly composed of ethylene, including an ethylene homopolymer termed a so-called high-pressure low-density polyethylene (HP-LDPE), straight chain or linear low density polyethylene (LLDPE), medium density polyethylene (MDPE) and high density polyethylene (HDPE), or an ethylene/α-olefin copolymer, and in addition thereto, a copolymer of ethylene and a small quantity of polar monomer such as an ethylene/vinyl acetate copolymer, a copolymer of ethylene and an unsaturated carboxylic acid such as acrylic acid, methacrylic acid, monoethyl maleate, maleic anhydride, etc., or its ionomer with Na, Li, Zn, Mg, etc., a copolymer of ethylene and an unsaturated carboxylic acid ester such as methyl acrylate, ethyl acrylate, isobutyl acrylate, n-butyl acrylate, 2-ethylhexyl acrylate, methyl methacrylate, glycidyl methacrylate, dimethyl maleate, etc., a copolymer of ethylene, the unsaturated carboxylic acid and unsaturated carboxylic acid ester described above, or its ionomer with Na, Li, Zn, Mg, etc., a copolymer comprising ethylene unit and carbon monoxide unit, and optionally an unsaturated carboxylic acid ester or vinyl acetate unit. These ethylene polymers (C) may be used as homopolymers or as a composition (mixture) of two or more polymers selected from these ethylene polymers.

An MFR (ASTM D1238, 190° C., under the load of 2160 g) of the ethylene polymer (C) is not particularly limited so long as, when the ethylene polymer (C) is mixed with the propylene polymer (A) and the ethylene/α-olefin random copolymer (B), the resulting ethylene polymer composition (D) is capable of forming a film; however, the MFR is generally in the range of 0.01 to 100 g/10 mins., preferably in the range of 0.1 to 70 g/10 mins.

As the ethylene polymer (C), copolymers of ethylene and α-olefins are preferably employed. In particular, low density polyethylene having a density of 895 to 925 kg/m$^3$, preferably 900 to 925 kg/m$^3$, medium density polyethylene having a density of greater than 925 kg/m$^3$ and up to 940 kg/m$^3$, and high density polyethylene having a density of greater than 940 kg/m$^3$ and up to 970 kg/m$^3$ are preferred, among which low density polyethylene having a density of 895 to 925 kg/m$^3$, and medium density polyethylene having a density of greater than 925 kg/m$^3$ and up to 940 kg/m$^3$ are most preferred. In the low density polyethylene, linear low density polyethylene is suitable.

In the linear low density polyethylene (LLDPE) described above, the molecular weight distribution (Mw/Mn) as determined by gel permeation chromatography (GPC) is normally in the range of 1.5 to 4.0, preferably in the range of 1.8 to 3.5. Also, the linear low density polyethylene (LLDPE) has one or more sharp endothermic peaks as determined from an endothermic curve by a differential scanning calorimeter (DSC) at a temperature elevation rate of 10° C./min. and the highest temperature of the peaks, that is, the melting point is generally in the range of 70 to 130° C., preferably in the range of 80 to 120° C.

The linear low density polyethylene (LLDPE) as described above can be prepared by known processes, using a multi-site catalyst typically represented by a Ziegler type catalyst, a single site catalyst typically represented by a metallocene catalyst. For example, the linear low density polyethylene (LLDPE) can be prepared by using a catalyst containing a metallocene compound of a transition metal. Preferably, the catalyst containing this metallocene compound is formed from (a) a metallocene compound of a transition metal, (b) an organoaluminumoxy compound and (c) a carrier and if necessary, may be formed from these components and (d) an organoaluminum compound and/or an organoboron compound. Catalysts for olefin polymerization containing such a metallocene compound and processes for preparing linear low density polyethylene (LLDPE) using these catalysts are described in, e.g., Japanese Patent Laid-Open Publication No. HEI 8(1996)-269270. The density of the ethylene polymer (C) in accordance with the present invention was measured on a sample after treatment with boiling water for 30 minutes, according to Method D of JIS K7112 (density gradient column method).

Ethylene Polymer Composition (D)

The resin composition having an easy-openable property of the present invention, which comprises the ethylene polymer composition (D), is prepared by mixing 5 to 65 wt %, preferably 10 to 60 wt % of the aforesaid propylene polymer (A), 1 to 35 wt %, preferably 5 to 30 wt % of the ethylene/α-olefin random copolymer (B) and 10 to 85 wt %, preferably 20 to 80 wt % of the ethylene polymer (C) (provided that the total amount of (A), (B) and (C) is made 100 wt %). In view of extrusion processability, sealing strength, heat resistance, etc., it is desired that the resin composition having an easy-openable property is prepared to have an MFR (ASTM D1238, 190° C., under the load of 2160 g) of 0.01 to 100 g/10 mins., preferably 0.1 to 70 g/10 mins.

If the amount of the propylene polymer (A) added is less than 5 wt %, the sealing strength becomes poor when the resulting heat-sealable film is heat-sealed to the propylene polymer layer and the heat resistance also decreases. If the amount added exceeds 65 wt %, the film fails to exhibit any proper sealing strength over a wide range of heat seal temperatures.

Where the amount of ethylene/α-olefin random copolymer (B) added is less than 1 wt %, there is a tendency that its sealing property, stringiness, etc. are deteriorated when the resulting heat-sealable film is heat-sealed to the propylene polymer layer. On the other hand, where the amount added exceeds 35 wt %, processability is impaired.

Where the amount of ethylene polymer (C) added is less than 10 wt %, the sealing strength becomes excessively strong when the resulting heat-sealable film is heat-sealed to the propylene polymer layer so that the easy openability turns to be deteriorated. On the other hand, where the amount added is so large to exceed 85 wt %, the sealing strength tends to be diminished.

The resin composition having an easy-openable property of the present invention may contain various additives within such a range that the object of the present invention is not damaged. These additives include inorganic fillers such as silica, talc, etc., antioxidants, weathering stabilizers, anti-static agents, anti-fogging agents, antiblocking agents, slip agents, pigments, etc. Especially when the inorganic filler is added in an amount of 10 parts by weight or less, preferably approximately 0.1 to 5 parts by weight, based on 100 parts by weight of the ethylene polymer composition (D), the extrusion processability, film slip characteristics, roll release property, etc. are improved, which is therefore preferable. The addition of antiblocking agents or slip agents of organic compound type, etc. is also effective for improving the processability or workability in film processing, lamination processing, packaging [operation], etc. Such antiblocking agents or slip agents of organic compound type include, for example, various amides such as palmitamide, stearamide, behenamide, oleamide, erucamide, oleylpalmitamide, stearylpalmitamide, methylenebis(stearylamide), methylenebis(oleylamide), ethylenebis(oleylamide), ethylenebis(erucamide), etc., polyalkylene glycols such as polyethylene glycol, polypropylene glycol, etc., hydrogenated castor oil, etc. A suitable amount of these agents added is approximately 0.01 to 1 by weight, based on 100 parts by weight of the ethylene polymer composition (D). Various additives described above can be added during preparation of the ethylene polymer composition, or, can be previously added to the components of the propylene polymer (A), the ethylene/α-olefin random copolymer (B), the ethylene polymer (C), etc., respectively.

The resin composition having an easy-openable property of the present invention can be prepared by mixing each component of the propylene polymer (A), the ethylene/α-olefin random copolymer (B) and the ethylene polymer (C) and additives optionally added, simultaneously or sequentially. In preparing this resin composition, these components are preferably melt-mixed by means of a single screw extruder, a twin screw extruder, a Bunbury mixer, various kneaders, etc. The order of mixing is not particularly limited.

Heat-Sealable Film

The heat-sealable film of the present invention is a film comprising the resin composition having an easy-openable property described above. Such a heat-sealable film can be prepared by a variety of known methods. Examples of these methods include a method which comprises mixing the propylene polymer (A), the ethylene/α-olefin random copolymer (B) and the ethylene polymer (C) in a given proportion, then directly feeding the mixture to a film processing machine and extruding into films through a T-die, a circular die, etc., a method which comprises previously mixing the propylene polymer (A), the ethylene/α-olefin random copolymer (B) and the ethylene polymer (C) in a given proportion, melt-kneading the mixture through an extruder, etc. and then molding the resulting resin composition having an easy-openable property into films using a T-die, a circular die, etc.

A thickness of the heat-sealable film is suitably determined depending upon its use application but is generally in the range from 1 to 1000 μm, preferably 2 to 100 μm.

In order to improve printability or adhesion to the substrate layer, etc., the surface of the heat-sealable film of the present invention may be previously surface-treated for activation by subjecting the heat-sealable film to, e.g., a corona treatment, a flame treatment, a plasma treatment, an undercoat treatment, etc.

Heat-Sealable Laminated Film

The heat-sealable laminated film of the present invention comprises the heat-sealable film comprising the resin composition having an easy-openable property, on one side of which a laminated layer and/or a substrate layer are laminated. The laminated layer in the present invention refers to a layer comprising the other thermoplastic resins in the heat-sealable laminated film obtained by coextruding and molding the other thermoplastic resins with the resin composition having an easy-openable property described above. The resultant heat-sealable laminated film can be used as a lid material just as it stands, and when the heat-sealable laminated film is further laminated with the substrate layer, the substrate layer is laminated on such a laminate layer side. As the thermoplastic resins which constitute the laminated layer, there can be used various polyolefin resins exemplified for the propylene polymer (A) or the ethylene polymer (C) described above. In addition, compositions obtained by mixing these various polyolefin resins with the resin composition having an easy-openable property of the present invention in an optional ratio may be used as well.

Especially when the heat-sealable laminated film of the present invention is processed by a T-die method, the resin composition having an easy-openable property described above is sometimes inferior in high-speed film processing capability (high-speed film processing performance). In that case, the resin composition is coextrusion-molded with the other thermoplastic resins, preferably with polyolefin resins such as the propylene polymer (A), the ethylene polymer (C), etc., especially with propylene homopolymers, whereby it becomes possible to form films at a higher speed. The heat-sealable laminated film having the laminated layer composed of such a propylene homopolymer is excellent in transparency and slip characteristics, and hence, even in the case that packages using the heat-sealable laminated film as a lid material are sterilized at high temperatures, the sealing strength is sufficiently retained without any reduction of the sealing strength and the laminated layer has an appropriate easy-openable property (easy peelability) when the contents packaged are taken out. Such a laminated layer may be a single layer or a multi-layer of two or more. In the case of multi-layer, kinds or properties of thermoplastic resins used can be varied in the respective layers. The propylene polymer, which is suitable as the laminated layer, has an MFR (ASTM D1238, 230° C., under the load of 2160 g) ranging from 0.01 to 100 g/10 mins., preferably 0.1 to 70 g/10 mins.

The heat-sealable laminated film of the present invention is a laminated film comprising the heat-sealable film layer described above and a laminated layer, a laminated film comprising the heat-sealable film layer described above and a substrate layer, or a laminated film comprising the heat-sealable film layer described above, a laminated layer (intermediate layer) and a substrate layer. As the substrate layer, preferred is a layer having excellent mechanical strength, stiffness, appearance, etc. and examples of the substrate layer include thermoplastic resin films such as polyester films represented by polyethylene terephthalate films, polyamide films, polyethylene films, polypropylene films, etc.; composite films such as aluminum-deposited polypropylene films, silica-deposited polyester films, oxidized aluminum-deposited polyester films, polyamide films with binary deposition of silica/aluminum oxide; aluminum foils, paper, etc. These thermoplastic resin films or composite films may be unoriented, uniaxially oriented or biaxially oriented films, or thick films generally termed sheets, and other flat-shaped substrates. Of course, the substrate layer may be a single layer or two or more layers. In the case of two or more layers, materials of different type or materials of the same type having different properties can be used in combination.

In the heat-sealable laminated film having the laminated layer, the laminated layer can be previously surface-treated for activation, e.g., by a corona treatment, a flame treatment, a plasma treatment, an undercoat treatment, etc. thereby to improve the printability or adhesion to the substrate layer or the like.

The heat-sealable laminated film of the present invention can be prepared by various known methods. For example, in the case that the laminated layer and/or the substrate layer is formed of thermoplastic resins, the resin composition having an easy-openable property, which constitutes a heat-sealed layer, and resins used for the laminated layer and/or the substrate layer may be coextruded using a coextrusion die to process the heat-sealable laminated film. Also, the resin composition having an easy-openable property or a mixture of the resin composition having an easy-openable property and thermoplastic resins forming the laminated layer may be extrusion- or coextrusion-laminated, or extrusion- or coextrusion-coated on the substrate layer previously obtained to prepare the heat-sealable laminated film. Or, a film and a heat-sealable film (heat-sealable laminated film), which are separately prepared, may be bonded to each other to prepare the heat-sealable laminated film.

A thickness of the heat-sealable laminated film of the present invention can be appropriately determined depending on the use application; a thickness of the heat-sealable film (heat-sealed layer) is generally in the range of 1 to 1000 μm, preferably 2 to 100 μm; a thickness of the laminated layer is generally in the range of 19 to 9000 μm, preferably 18 to 900 μm; when the laminated layer consists of two layers, a thickness of its intermediate layer is generally in the range of 18 to 8000 μm, preferably 16 to 800 μm; a thickness of its outer layer is generally in the range of 1 to 1000 μm, preferably 2 to 100 μm; and when the laminated layer has a substrate layer, a thickness of the substrate layer is generally in the range of 5 to 100 μm, preferably 9 to 50 μm. The whole thickness of the heat-sealable laminated film is generally in the range of 20 to 10000 μm, preferably 20 to 1000 μm.

Lid Material

The heat-sealable film or the heat-sealable laminated film described above can be used as various packaging materials. A preferred example of the packaging materials includes a lid material for container, in which the heat-sealable film layer is used as the innermost layer of the container. In the case of using as lid materials, the heat-sealable (laminated) film of a single layer or multi-layer structure having the heat-sealed layer obtained by the method described above may be directly used as lid materials, or may be printed thereon and then provided for use. The film may further be bonded to printed or unprinted paper, aluminum foil, etc., and the resulting product may be used as lid materials. Depending on the use application, the film may be previously cut along the shape of a container and provided as lid materials. When the film is used as lid materials, it is preferred to use the heat-sealable laminated film having provided the substrate layer.

Material to be Sealed

The resin composition having an easy-openable property or the heat-sealable (laminated) film of the present invention can be heat-sealed to various materials to be sealed, thereby forming the heat-sealed layer. Examples of such materials to be sealed include propylene polymers, ethylene polymers, polystyrenes, polyesters, polycarbonates, polyvinyl chloride or a mixture of these polymers, etc. These materials to be sealed may have various shapes such as a film, sheet, tray, cup, bottle, etc. The material to be sealed may be a single layer, or may be a laminated by coextrusion, dry lamination, extrusion lamination, etc. of these polymers or with other polymers, paper, etc. Particularly when the propylene polymer is used as the material to be sealed, the heat-sealed layer is excellent in sealability, easy openability, heat resistance, oil resistance, etc., which is preferable. These propylene polymers are in the same category as the propylene polymer (A) used in the ethylene polymer composition (D), and physical properties of the individual polymers may be the same or different. For example, in the material to be sealed, which comprises a propylene polymer, there can be used propylene polymers, which are molded into various shapes such as a film, sheet, tray, cup, bottle, etc. by known methods to fit materials packaged. In the case of a film or sheet, it can be prepared in the same way as in the heat-sealable film described above. In the case of a tray or cup, once a sheet is prepared as described above and the sheet is then subjected to thermoforming such as vacuum molding, pressure forming, etc. to mold into a container such as a tray, a cup, etc. In the case of a cup or bottle, a container of this shape can be prepared by injection molding, injection blow molding, blow molding, etc. In order to improve moldability, the ethylene polymer (C) may be previously added to the propylene polymer appropriately.

Package

Where the resin composition having an easy-openable property or the heat-sealable (laminated) film of the present invention is used as a packaging material, the heat-sealable (laminated) film itself may be, e.g., folded to form a three sided seal package, or two heat-sealable (laminated) films may be sealed on the four sides to form a package, or the heat-sealable (laminated) film may be heat-sealed to the aforesaid various materials to be sealed to form the heat-sealed layer, which may be used as packages. The package of the present invention can take various shapes depending on the shape, form or use application of the content materials to be packaged. For example, as flexible [soft] packages, there are a four sided seal package obtained by filling the content material to be packaged into a three sided seal package having a heat-sealed layer comprising the heat-sealable laminated film and the propylene polymer layer and then heat-sealing the opening, a sheet having a heat-sealed layer comprising the propylene polymer layer, a package obtained by filling a material to be packaged in a tray, a cup, a bottle or the like and sealing the upper end of a lid material (sealing material) having the heat-sealed layer of the heat-sealable laminated film as the innermost layer; etc.

EXAMPLES

Next, the present invention will be specifically described by referring to EXAMPLES but is not deemed to be limited to these EXAMPLES, unless they depart from the spirit and scope of the present invention. Starting materials used in EXAMPLES and COMPARATIVE EXAMPLES are as follows.

[Starting Material]

(1) Propylene Polymer (A)

PP: propylene/ethylene/1-butene random copolymer (ethylene content: 3.6 mol % (2.4 wt %), 1-butene content: 1.9 mol % (2.5 wt %), density: 910 kg/m$^3$, MFR (230° C.): 6 g/10 mins.)

(2) Ethylene/α-Olefin Random Copolymer (B)

VL: ethylene/1-butene random copolymer (density: 886 kg/m$^3$, ethylene content: 89.1 mol %, crystallinity: 10%, melting point: 69° C., MFR (190° C.): 4.0 g/10 mins.)

(3) Ethylene Polymer (C)

LL-1: Linear low density polyethylene (density: 915 kg/m$^3$, MFR (190° C.): 2.0 g/10 mins.)

LL-2: Linear low density polyethylene (produced by using a metallocene catalyst, density: 915 kg/m$^3$, MFR (190° C.): 4.0 g/10 mins.)

LL-3: Linear low density polyethylene (density: 915 kg/m$^3$, MFR (190° C.): 15 g/10 mins.)

LL-4: Linear low density polyethylene (produced by using a metallocene catalyst, density: 895 kg/m$^3$, MFR (190° C.): 4.0 g/10 mins.)

LD: High pressure low density polyethylene (density: 923 kg/m$^3$, MFR (190° C.): 3.7 g/10 mins.)

HD: High density polyethylene (density: 954 kg/m$^3$, MFR (190° C.): 1.1 g/10 mins.)

Examples 1-9, Comparative Examples 1-4

An blown film of 50 μm was prepared from the ethylene polymer compositions shown in TABLE 1. The blown film was laminated on the low density polyethylene film side of a two-layered laminate film composed of biaxially oriented polyethylene terephthalate (O-PET, 12 μm thick)/low density polyethylene (20 μm thick), which laminate film had been previously prepared, by a sandwich lamination method using low density polyethylene (20 μm thick) as an adhesive layer. A test substrate was thus obtained.

The test substrate was superposed on a propylene polymer sheet having a thickness of 300 μm so as to abut against the ethylene polymer composition side of the substrate, which was heat-sealed under the conditions of 160° C., a pressure of 0.2 MPa and a dwelling time for 1.0 second. The laminate was thus obtained. A peel strength when the test substrate member was peeled from the laminate was measured. After the peel strength was measured, the sealed part of the sample was observed for the state of stringiness. Ranks A, B and C indicate as follows. A: state of no stringiness to a slight stringiness, B: state of less stringiness, and C: state of much stringiness. These results are also shown in TABLE 1.

TABLE 1

|  |  | EXAMPLE |  |  |  |  |  |  |  |  | COMPARATIVE EXAMPLE |  |  |  |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| Starting Material (part by weight) | PP | 10 | 30 | 60 | 30 | 50 | 40 | 30 | 40 | 40 | 60 | 30 | 40 | 70 |
|  | VL | 10 | 10 | 10 | 30 | 10 | 30 | 10 | 10 | 10 |  |  |  | 10 |
|  | LL-1 | 80 | 60 | 30 | 40 |  |  | 40 |  | 30 | 40 |  |  | 20 |
|  | LL-2 |  |  |  |  | 40 |  |  | 40 |  |  | 40 |  |  |
|  | LL-3 |  |  |  |  |  |  | 20 |  |  |  | 60 |  |  |
|  | LL-4 |  |  |  |  |  |  |  |  |  |  | 10 |  |  |
|  | LD |  |  |  |  |  |  |  |  | 10 |  |  |  |  |
|  | HD |  |  |  |  |  | 30 |  | 20 |  |  |  | 20 |  |
| Peel Strength (N/15 mm) |  | 28 | 18 | 20 | 29 | 20 | 29 | 28 | 28 | 26 | 39 | 25 | 27 | 33 |
| State of Peeling |  | A | A | A | A | A | B | B | B | B | C | C | C | C |

Example 10

Using the ethylene polymer composition (D-5) previously produced by melt-kneading 50 wt % of PP, 10 wt % of VL and 40 wt % of LL-2 and as a laminated layer a propylene homopolymer (PP-1) (melting point: 160° C., MFR (230° C.): 7.0 g/10 mins.) in the intermediate layer (intermediate laminated layer) and the outer layer (surface laminated layer) of a heat-sealed layer, D-5 and PP-1 were fed to separate extruders, respectively, to form the heat-sealable laminated film comprising the coextruded three-layer film having the structure of the heat-sealed layer/intermediate layer/surface laminated layer by means of a T-die method, followed by a corona treatment on the surface laminated layer. The whole thickness of the film was 30 μm and the thickness of each layer was the heat-sealed layer/intermediate laminated layer/surface laminated layer=3/24/3 μm.

A biaxially oriented polyethylene terephthalate film (O-PET) having a thickness of 12 μm was laminated on the corona-treated surface of the heat-sealable laminated film described above by dry lamination using a urethane adhesive to prepare a laminated film. This laminated film was superposed on a propylene polymer sheet having a thickness of 300 μm so as to abut against the heat-sealed layer and sealed for a second under a pressure of 0.2 MPa by means of a seal bar having a width of 5 mm, and then allowed to cool. A test piece having a width of 15 mm was cut out of the sealed product and the heat-sealed part was peeled off at a cross head speed of 500 mm/min. The strength of the heat-sealed part was defined as a peel strength (N/15 mm). The peel strength after a hot water treatment of the heat-sealed test piece at 110° C. for 30 minutes using a high pressure/high temperature sterilizer was also measured in the same manner. Furthermore, the states of peeling and stringiness were observed at the sealed part of the test piece after its peel strength was measured. Symbols denote as follows.

⊚: cohesive peeling without stringiness
○: Interfacial peeling without stringiness
X: Cohesive peeling with much stringiness
The results are shown in TABLE 2.

Example 11

Heat-sealable laminated films were prepared in a manner similar to EXAMPLE 10 except that the propylene/ethylene random copolymer (PP-2) (melting point: 143° C., MFR (230° C.) 7.0 g/10 mins.) was used for the intermediate laminated layer, in place of PP-1 in EXAMPLE 10. The peeling characteristics of the heat-sealed parts were evaluated. The results are shown in TABLE 2.

Examples 12-14

Heat-sealable laminated films were prepared in a manner similar to EXAMPLE 10 except that the compositions shown in TABLE 2 were used for the intermediate laminated layer in EXAMPLE 10. The peeling characteristics of the heat-sealed parts were evaluated. The results are shown in TABLE 2.

TABLE 2

| | EXAMPLE | | | | |
|---|---|---|---|---|---|
| | 10 | 11 | 12 | 13 | 14 |
| Structure of Heat-Sealable Laminated Film (wt %) | | | | | |
| Heat-sealed layer | D-5 | D-5 | D-5 | D-5 | D-5 |
| Intermediate layer | PP-1 | PP-2 | PP-1 (50) | PP-1 (70) | PP-1 (60) |
| | | | D-5 (50) | D-5 (30) | D-5 (40) |
| Surface layer | PP-1 | PP-1 | PP-1 | PP-1 | PP-1 |
| Peel strength (N/15 mm) and State of Peeling (prior to hot water treatment) | | | | | |
| Heat seal 140° C. | 13.3 ○ | 11.3 ○ | 10.8 ○ | 6.5 ○ | 11.0 ○ |
| Temperature 160° C. | 17.9 ⊚ | 17.6 ⊚ | 16.2 ⊚ | 15.5 ⊚ | 15.8 ⊚ |
| 180° C. | 17.1 ⊚ | 16.9 ⊚ | 16.5 ⊚ | 16.0 ⊚ | 16.1 ⊚ |
| 200° C. | 19.0 ⊚ | 24.2 X | 22.5 X | 16.4 X | 23.5 X |
| Peel strength (N/15 mm) and State of Peeling (after hot water treatment) | | | | | |
| Heat seal 140° C. | 12.2 ○ | 10.0 ○ | 10.1 ○ | 4.1 ○ | 9.8 ○ |
| Temperature 160° C. | 17.1 ⊚ | 17.4 ⊚ | 16.1 ⊚ | 14.8 ⊚ | 15.5 ⊚ |
| 180° C. | 18.1 ⊚ | 16.5 ⊚ | 16.3 ⊚ | 15.3 ⊚ | 15.9 ⊚ |
| 200° C. | 18.9 ⊚ | 24.0 ⊚ | 21.8 X | 16.0 X | 20.5 X |

Example 15

Using the ethylene polymer composition (D-5) for a heat-sealed layer, the composition obtained by dry-blending 85 wt % of high density polyethylene (HDPE) (produced by Mitsui Chemicals, Inc., trade name: HIE-ZEX 3300F, density: 954 kg/m³, MFR (190° C.): 1.1 g/10 mins., melting point: 131° C.) and 15 wt % of high-pressure low-density polyethylene (HP-LDPE) (produced by Mitsui Chemicals, Inc., trade name: MIRASON 11P, density: 917 kg/m³, MFR (190° C.): 7.2 g/10 mins., melting point: 106° C.) for an intermediate laminated layer and linear low density polyethylene (LL-DPE) (produced by Mitsui Chemicals, Inc., trade name: ULT-ZEX 1520L, density: 915 kg/m³, MFR (190° C.): 2.3 g/10 mins., melting point: 115° C.) for a surface laminated layer, a heat-sealable laminated film comprising the coextruded three layered film having the structure of the heat-sealed layer/intermediate layer/surface laminated layer was formed by means of a T-die method, followed by a corona treatment on the surface laminated layer. The whole thickness of the film was 30 μm and the thickness of each layer was the heat-sealed layer/intermediate laminated layer/surface laminated layer=4.5/21.0/4.5 μm.

Next, the heat-sealable laminated film thus obtained was laminated on O-PET having a thickness of 12 μm as in EXAMPLE 10 and the physical properties were evaluated. The results are shown in TABLE 3.

TABLE 3

| | EXAMPLE 15 |
|---|---|
| Structure of Heat-Sealable Laminated Film (wt %) | |
| Heat-sealed layer | D-5 |
| Intermediate layer | HDPE(85) |
| | HP-LDPE(15) |
| Surface layer | LLDPE |
| Peel strength (N/15 mm) and State of Peeling (prior to hot water treatment) | |
| Heat seal 140° C. | 13.0 ○ |
| Temperature 160° C. | 21.0 ⊚ |
| 180° C. | 21.8 ⊚ |
| 200° C. | 22.5 ⊚ |

TABLE 3-continued

| | EXAMPLE 15 | |
|---|---|---|
| Peel strength (N/15 mm) and State of Peeling (after hot water treatment) | | |
| Heat seal Temperature | 140° C. | 13.7 ○ |
| | 160° C. | 20.5 ◉ |
| | 180° C. | 20.7 ◉ |
| | 200° C. | 21.6 ◉ |

As is clear from TABLES 2 and 3, it is noted that the heat seal characteristics for the propylene polymer sheet vary somewhat depending on the kind of laminated layers but when appropriate heat seal conditions are chosen, the heat seal strength is retained even after the hot water treatment and useful as packaging materials for high temperature sterilization. Especially when the propylene polymer is used in the laminated layer, its transparency is not deteriorated even after the hot water treatment at temperatures exceeding 110° C. and accordingly, packages with a high commercial value can be obtained. In addition, when the ethylene polymer is employed in the laminated layer, the heat-sealable laminated film over a wide range of temperature acceptance for heat seal can be provided.

INDUSTRIAL APPLICABILITY

The resin composition having an easy-openable property of the present invention, which is the ethylene polymer composition comprising the propylene polymer (A), the ethylene/α-olefin random copolymer (B) and the ethylene polymer (C) is suitable as heat sealable materials having an easy-openable property, especially as heat sealable materials having an easy-openable property for packaging materials, preferably as heat sealable materials having an easy-openable property for propylene polymers. Moreover, the resin composition having an easy-openable property of the present invention is per se excellent in the antiblocking properties, hygienic properties, film processability and lamination processability. When the heat-sealable (laminated) film having the heat-sealed layer comprising the resin composition having an easy-openable property is heat-sealed to the propylene polymer layer, the sealed product has a stable heat seal strength (peel strength) over a wide temperature range, can be easily peeled apart when it is peeled (when opening) and with smooth and soft feeling. Therefore, the heat sealable film is suitable as packaging films, especially for use as lid materials for propylene polymer-made sheets, trays, cups, bottles, etc., and can be advantageously used as packaging materials for snack packages for rice crackers, potato chips, etc., fluid packages for jelly, milk, yogurt, pudding, tofu (soybean curd), lactic acid beverage, etc., blister packages, and other packages for medical drugs, medical instruments, daily goods and miscellaneous goods.

The invention claimed is:

1. A heat-sealable laminated film obtained by laminating a substrate layer on one surface of a heat-sealable film comprising a resin composition having an easy-openable property directly or through a laminated layer, wherein the resin composition comprises an ethylene polymer composition (D) comprising 5 to 65 wt % of a propylene polymer (A), 1 to 35 wt % of an ethylene/α-olefin random copolymer (B) having a density of less than 895 kg/m$^3$ and 10 to 85 wt % of an ethylene polymer (C) selected from the group consisting of (a) a linear low density polyethylene having a density of 895 to 925 kg/m$^3$ prepared by using a catalyst containing a metallocene compound of a transition metal and (b) a high density polyethylene having a density of greater than 940 kg/m$^3$ and up to 970 kg/m$^3$ (in a total amount of 100 wt %).

2. The heat-sealable laminated film according to claim 1, wherein the propylene polymer (A) is a propylene/α-olefin random copolymer.

3. The heat-sealable laminated film according to claim 1, wherein the ethylene/α-olefin random copolymer (B) is a random copolymer with an α-olefin having at least 4 carbon atoms and has a crystallinity in the range of 5 to 40% as measured by X-rays.

4. The heat-sealable laminated film according to claim 1, wherein an inorganic filler is added in an amount of not greater than 10 parts by weight, based on 100 parts by weight of the ethylene polymer composition (D).

5. The heat-sealable laminated film according to claim 1, wherein the laminated layer comprises a propylene homopolymer.

6. A lid material for container, which comprises the heat-sealable laminated film according to claim 1.

7. A package comprising the heat sealable laminated film according to claim 1 and a part to be sealed having a propylene polymer layer, and having a heat-sealed structure between the laminated film and the propylene polymer layer.

8. A heat-sealed article obtained by heat-sealing the heat-sealable laminated film according to claim 1 and a propylene polymer being superposed on the heat-sealable laminated film.

9. The heat-sealed article according to claim 8, wherein the article is peeled off by cohesive peeling of the heat-sealable laminated film.

* * * * *